Sept. 15, 1942.  E. G. BIEDERMAN ET AL  2,295,925
MULTIPLE SPOT WELDER
Filed July 3, 1939  10 Sheets-Sheet 1

INVENTORS.
DELMAR S. HARDER.
BY EDWARD G. BIEDERMAN.
Barnes, Kisselle, Laughlin & Raisch
ATTORNEYS.

Sept. 15, 1942.    E. G. BIEDERMAN ET AL    2,295,925
MULTIPLE SPOT WELDER
Filed July 3, 1939    10 Sheets-Sheet 2

INVENTORS.
DELMAR S. HARDER.
BY  EDWARD G. BIEDERMAN
Barnes, Kisselle, Laughlin & Raisch
ATTORNEYS.

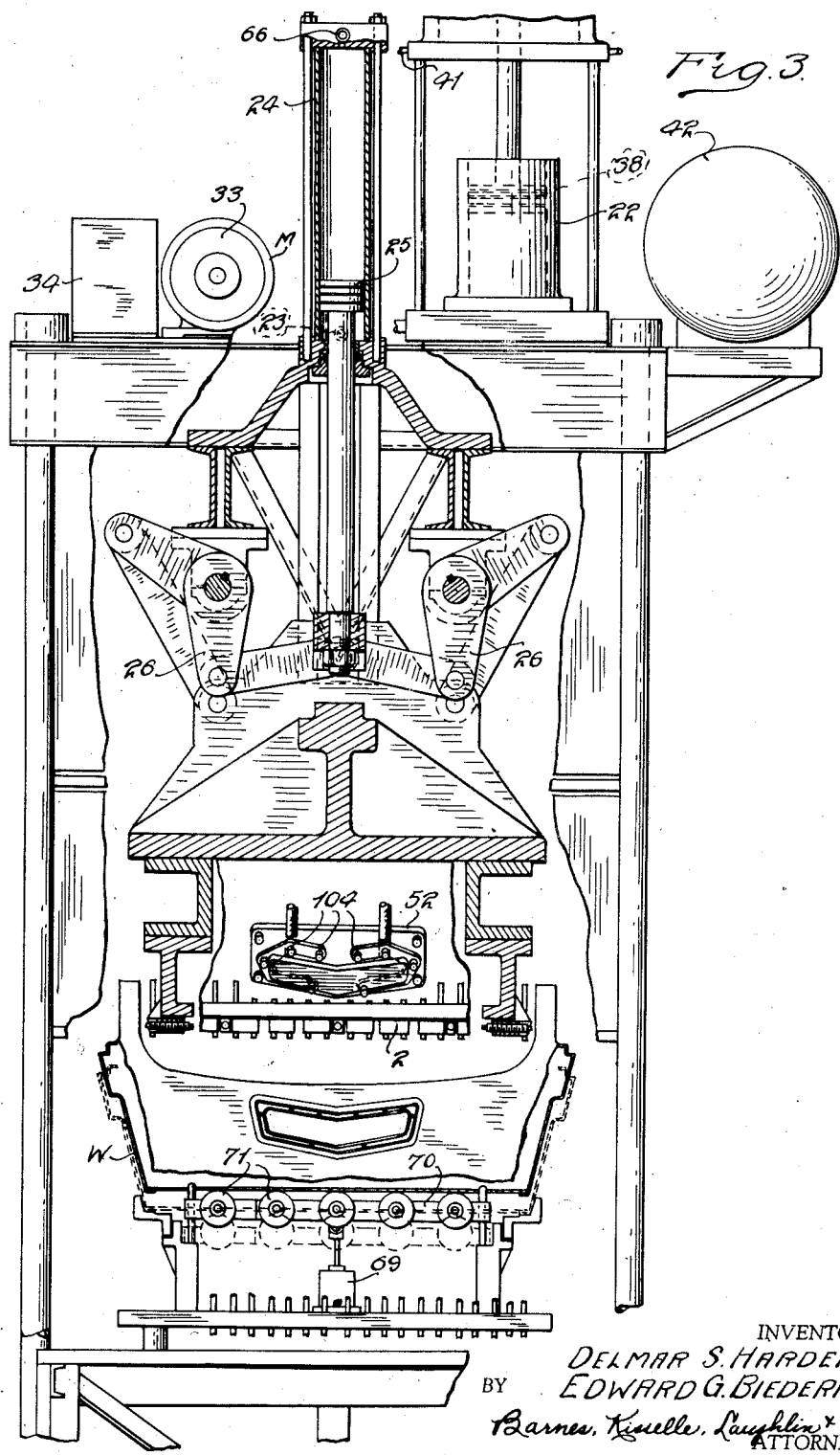

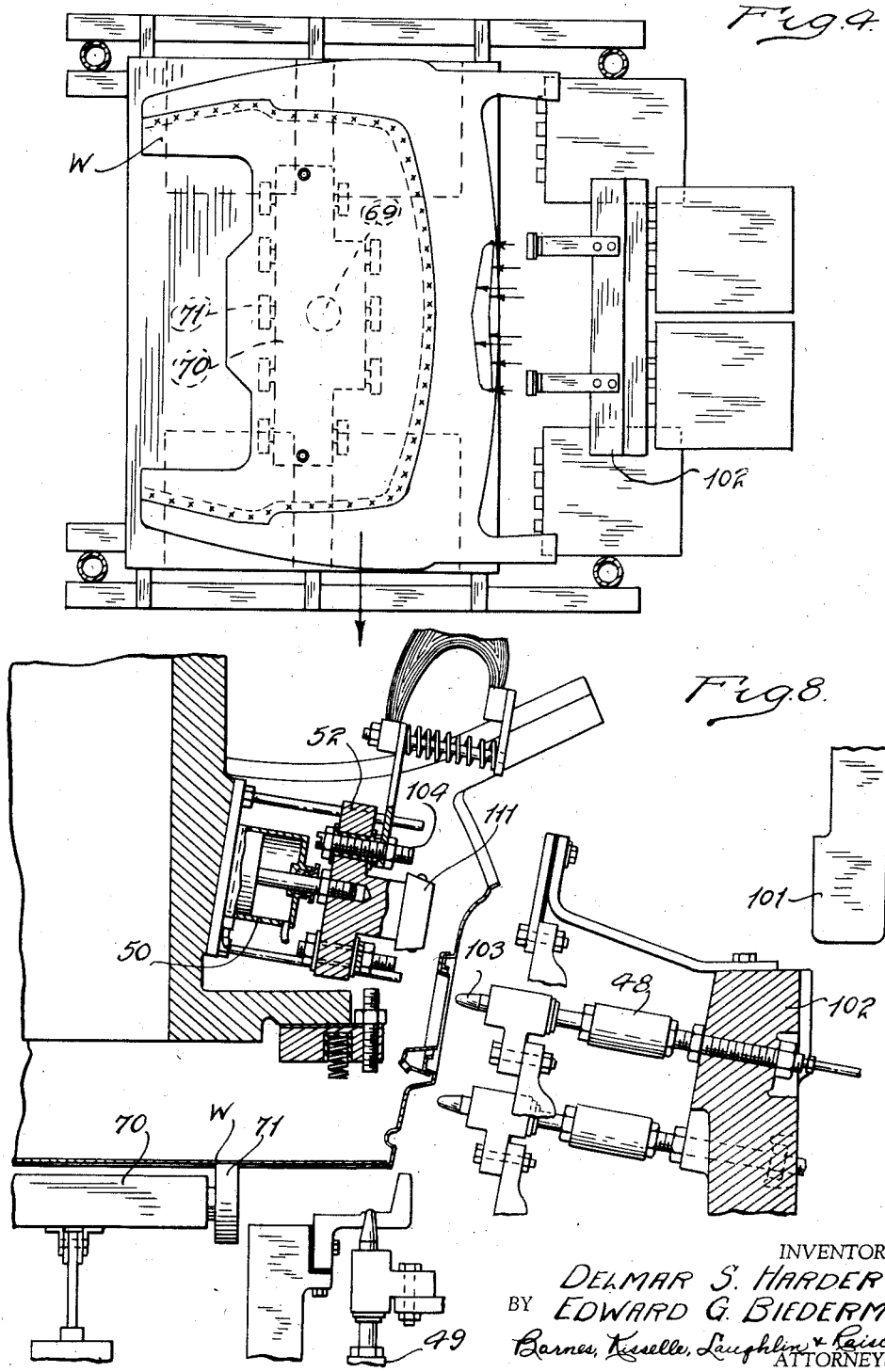

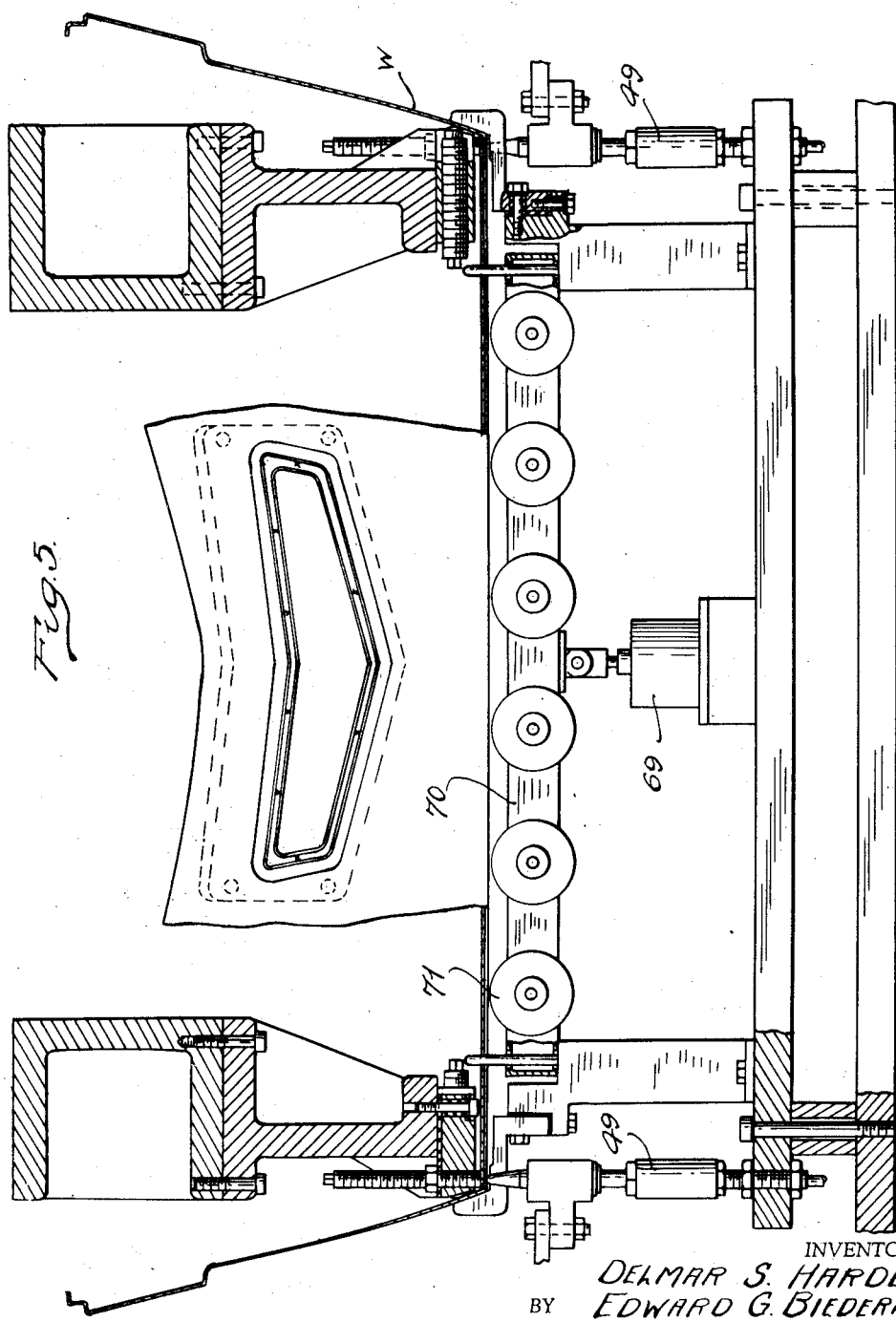

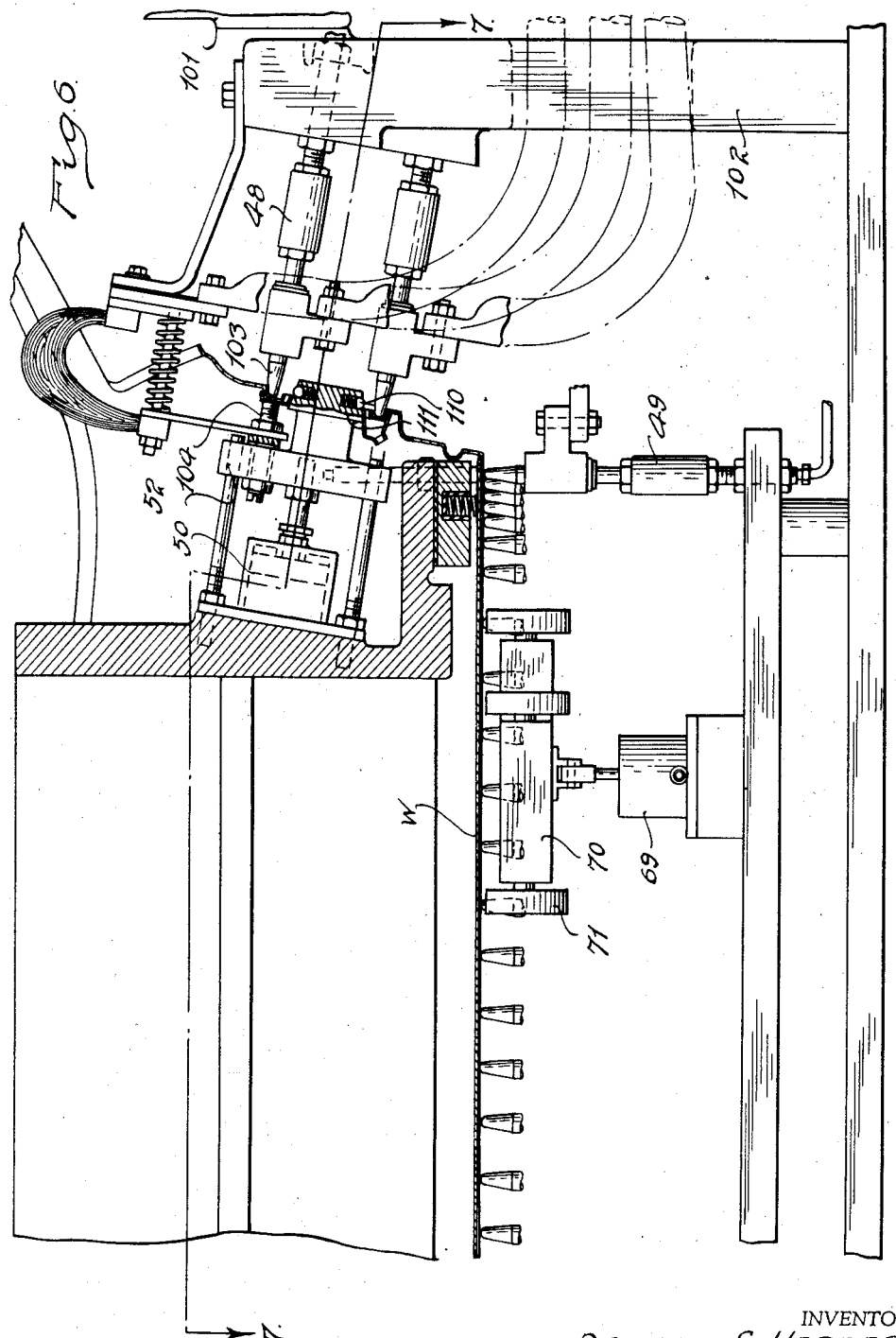

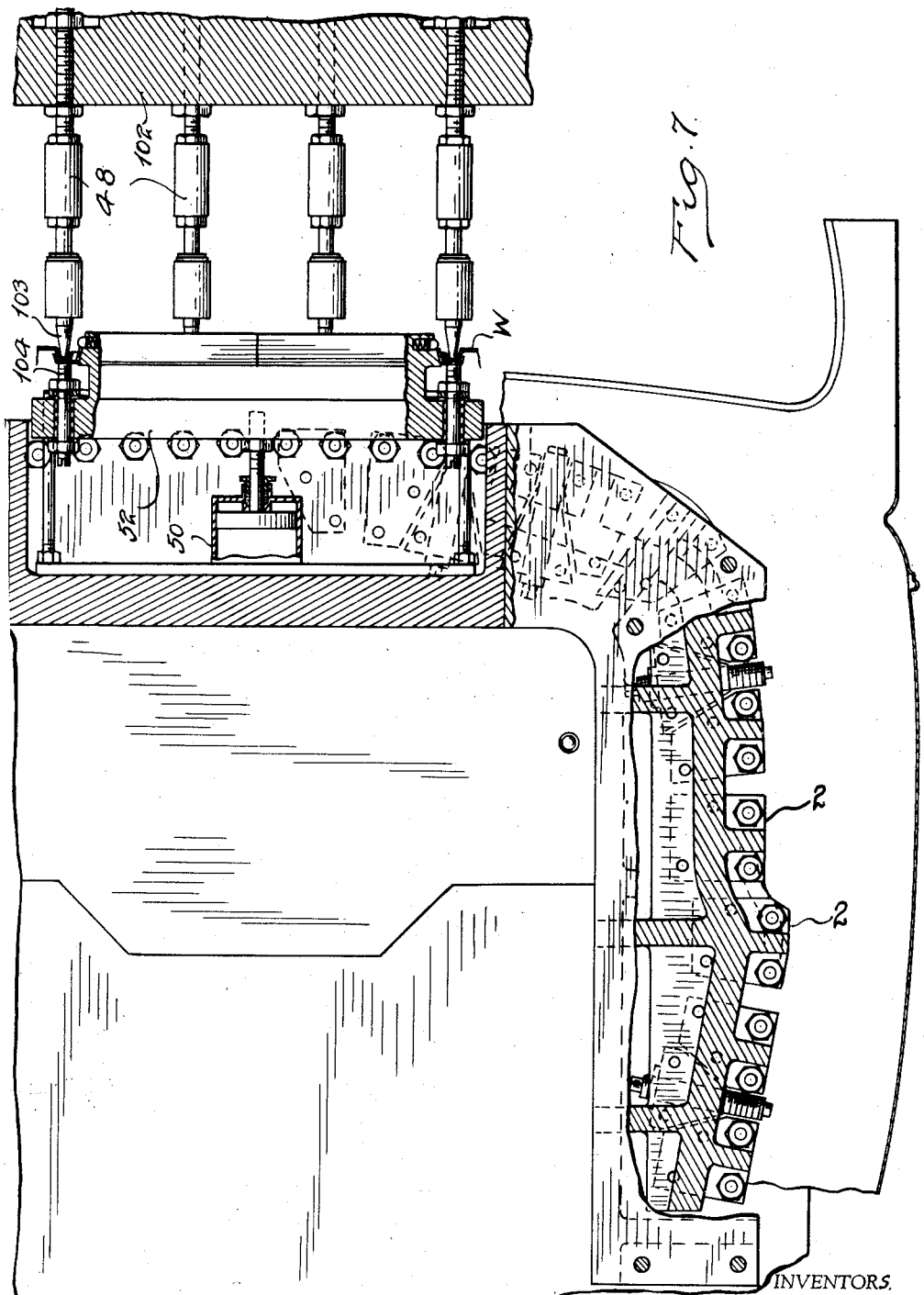

Sept. 15, 1942.  E. G. BIEDERMAN ET AL  2,295,925
MULTIPLE SPOT WELDER
Filed July 3, 1939   10 Sheets-Sheet 8

INVENTORS.
DELMAR S. HARDER.
BY EDWARD G. BIEDERMAN.
Barnes, Kisselle, Laughlin & Raisch
ATTORNEYS.

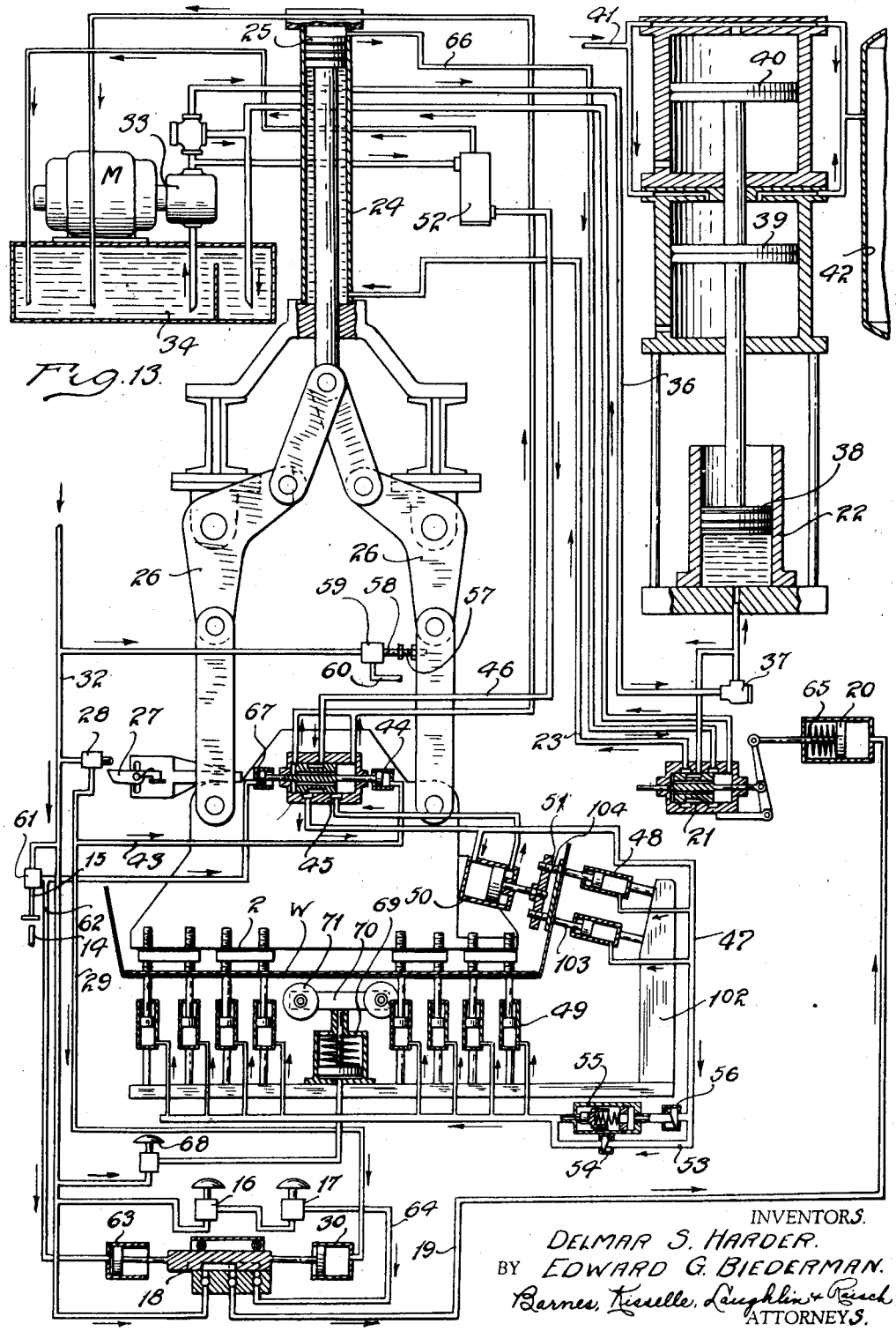

Sept. 15, 1942.  E. G. BIEDERMAN ET AL  2,295,925
MULTIPLE SPOT WELDER
Filed July 3, 1939    10 Sheets-Sheet 10
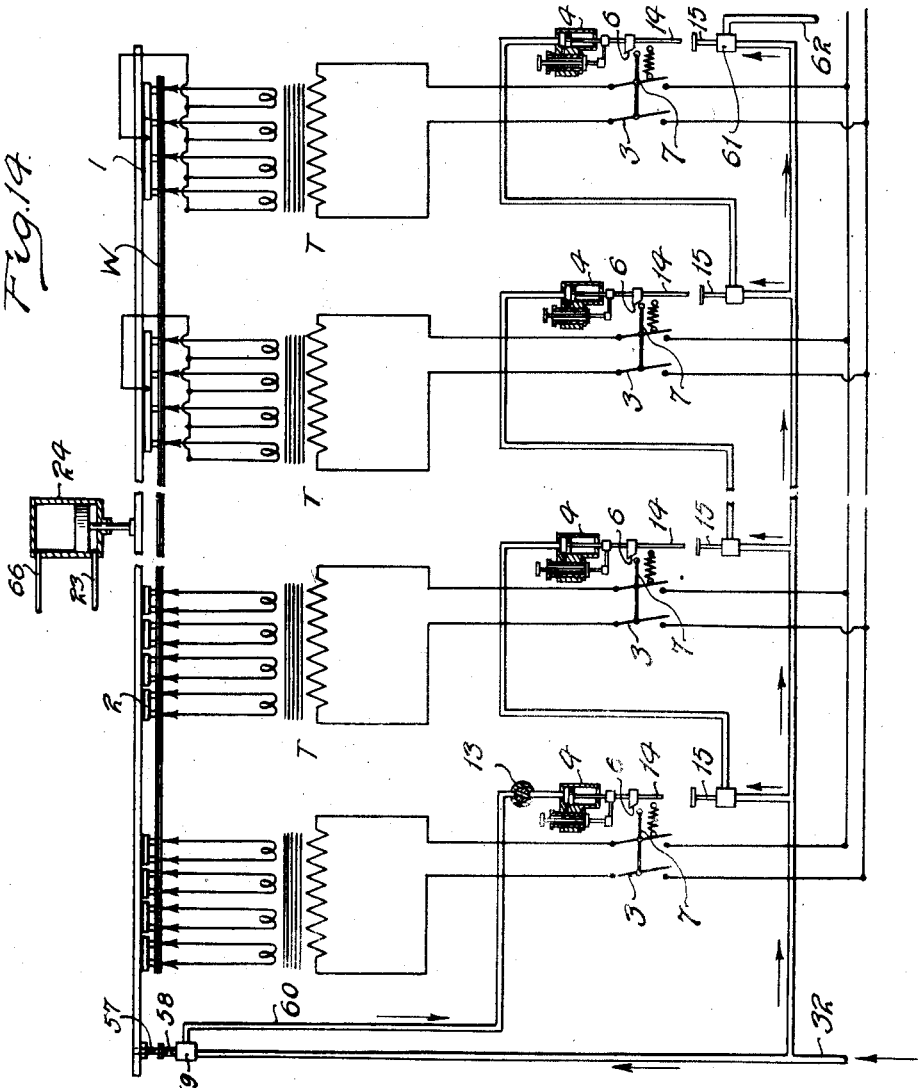
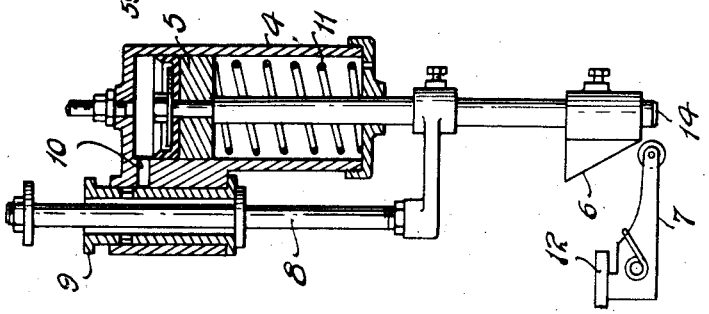
INVENTORS.
DELMAR S. HARDER.
EDWARD G. BIEDERMAN.
BY Barnes, Kisselle, Laughlin & Reisch
ATTORNEYS.

Patented Sept. 15, 1942

2,295,925

UNITED STATES PATENT OFFICE 2,295,925

MULTIPLE SPOT WELDER

Edward G. Biederman and Delmar S. Harder, Detroit, Mich., assignors to General Motors Corporation, Detroit, Mich., a corporation of Delaware Application July 3, 1939, Serial No. 282,640

22 Claims. (Cl. 219—4)

This invention relates to gang spot welding machines. It has for its object a spot welder in which the electrodes are all in contact with the work when the same are given successive shots of current. This method of welding has already been proposed but some difficulty has been experienced in distributing the current successively to the electrodes by reason of arcing and destruction of the contacts where the circuits are made and broken.

It has been proposed to have a distributor in the secondary circuit but the current is of such large amperage in the secondary circuit that destructive arcing takes place. It has been proposed to overcome this difficulty by breaking the primary circuit each time before the secondary circuit is broken. While this is feasible, it has not worked out so well in practice, for secondary circuit switches are open to many difficulties on account of the large current carried. Dirt or foreign particles getting onto the contacts causes destructive arcing, even though the switches are opened and closed while the circuit is dead.

It has been found very desirable to have all the electrodes contact the work at a given time. The welding can be more rapidly done. It effects a great saving of wear on the electrodes because the pounding of the electrodes is excessive when they have to be rapidly, successively brought into contact with the work. Where all are brought into contact with the work at one time, the approach can be gentle and this pounding, noise and wear obviated. And, finally, it has been found that a neater, better weld results for the reason that the electrodes are in better shape and also because the electrodes are in contact with the work before and after the current has been applied.

It is the object of this invention, therefore, to employ gang spot welding with a simultaneous contact of electrodes but with successive shots under conditions which will eliminate all switching operations in the secondary circuit and, therefore, obviate the difficulties met with secondary circuit switches. This is accomplished by grouping the electrodes in limited sets, each set connected with a separate transformer and then successively shooting shots of primary current into the several transformers. Preferably, the electrodes that are all in one group are also arranged pairs in series. So, in each transformer, there are a plurality of independent secondary circuits, each circuit having two electrodes in series.

Referring to the drawings:

Fig. 3 is a view similar to Fig. 2 showing the ram raised and the ejector raised.

Fig. 4 is a plan view looking down upon the completed work.

Fig. 5 is a fragmentary view showing the work, the ram with electrode pads, electrodes and the ejector and work gages.

Fig. 6 is a sectional view, showing the ventilator frame welding electrode and back-up pins or pads.

Fig. 7 is a section on the line 7—7 of Fig. 6.

Fig. 8 is a fragmentary view showing the electrodes retracted and the work raised by the ejector.

Fig. 13 is a diagrammatic view of the machine.

Fig. 14 is a diagram of the circuits.

Fig. 15 is a longitudinal section of a contactor.

Figure 1:
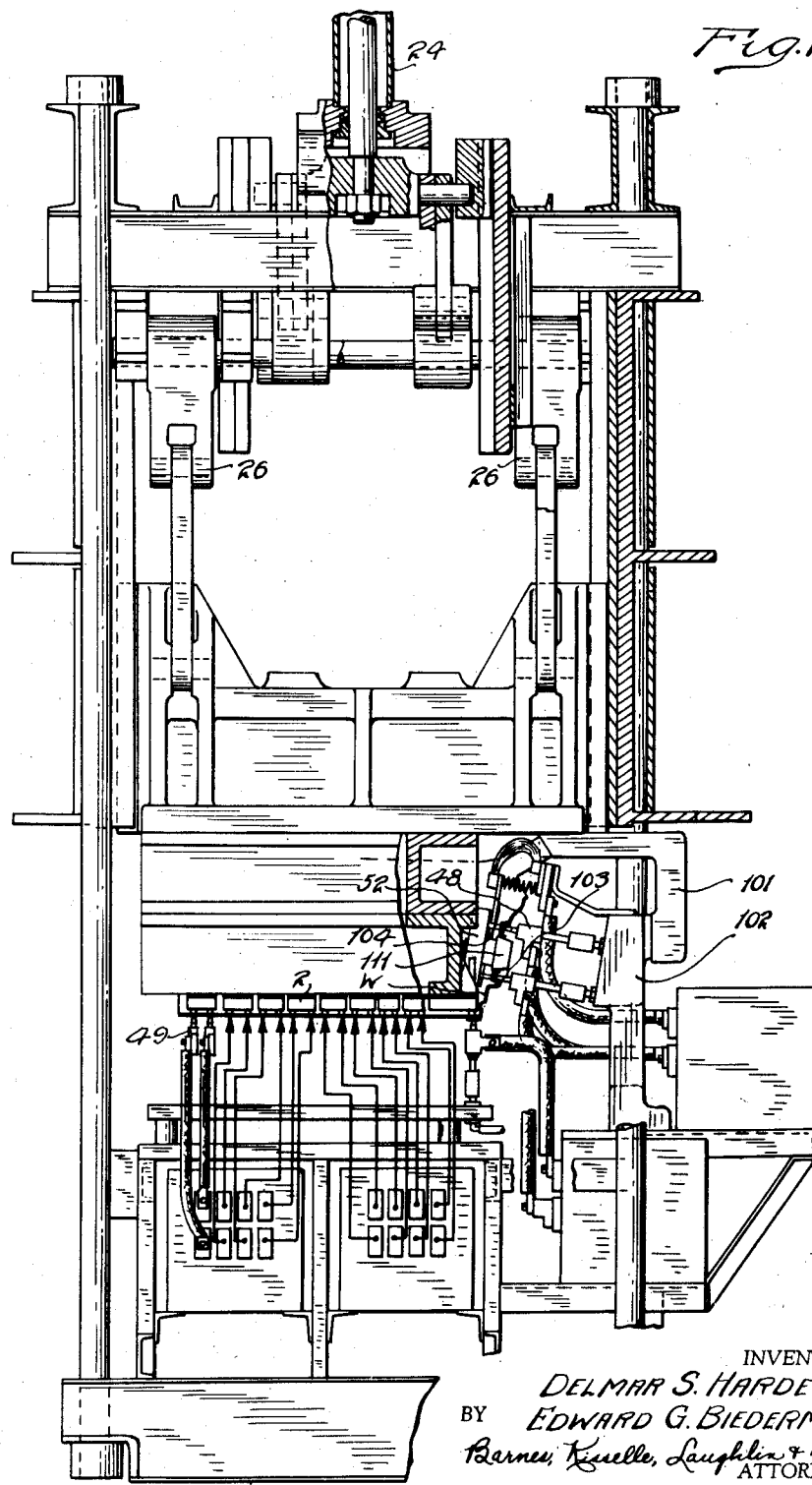
Fig. 1 is a front elevation, partly in section, of a welding machine for welding a shroud to the dash panel and the ventilator gutter to the shroud top panel.
Figure 2:
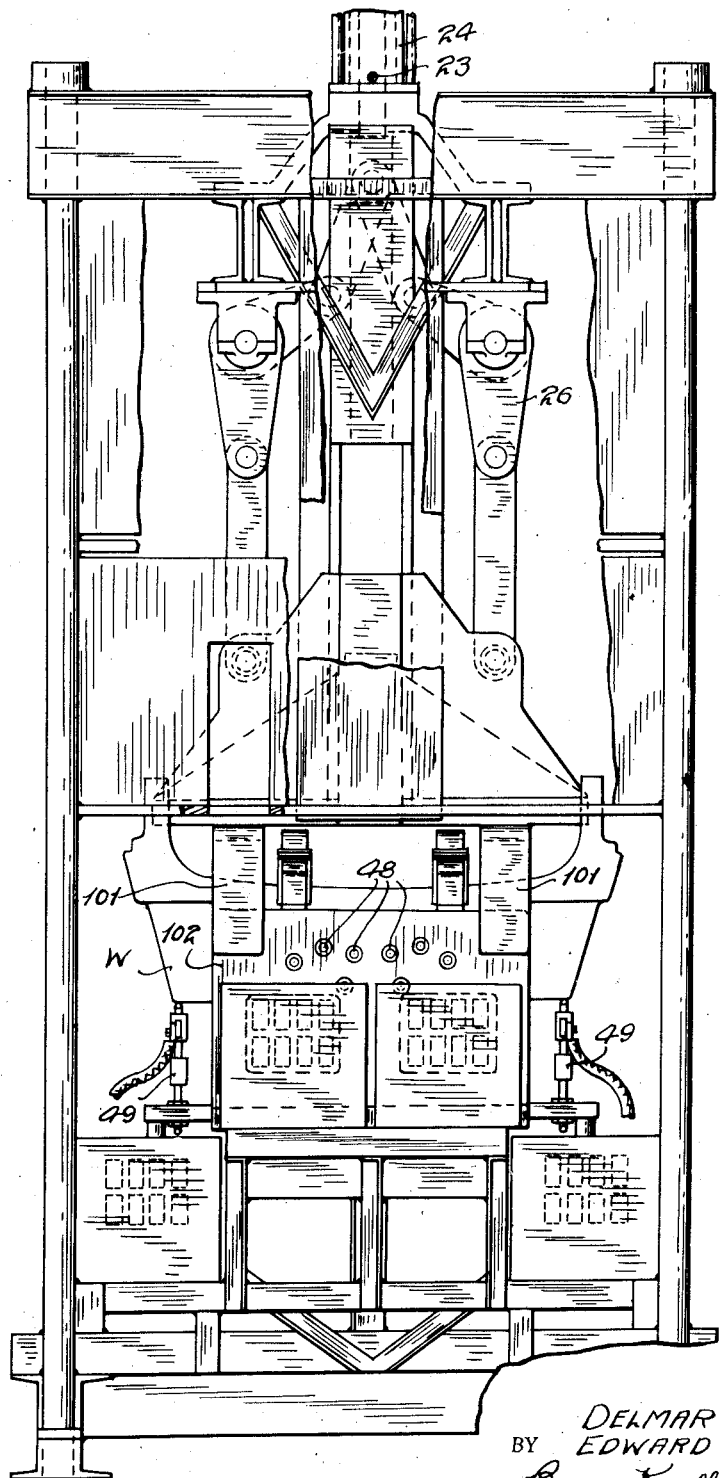
Fig. 2 is an end elevation of the same.

Referring to Fig. 14: The layout of the circuits and the general principle of the apparatus will be seen. Each transformer T has four secondary coils. More or less coils may be used. The two transformers on the right hand side have only four electrodes in contact with the work W. These electrodes all feed the current into the single pad 1.

In the arrangement shown with the two transformers at the left, there are eight electrodes in connection with each transformer and the electrodes are arranged pairs in series by reason of the four separate pads 2. In Fig. 14, the primary circuits are closed by primary switches 3 which are controlled by contactors 4. The contactor is shown in Fig. 15 and is described and claimed in Biederman Patent No. 2,058,553. It is sufficient here to say that a fluid turned into the cylinder of the contactor above the piston 5 causes the downward movement of the piston carrying cam 6 to trip the arm 7. Rod 8 moves downwardly with the piston 5 and pushes down the relief valve 9 so its ports register with the port 10 in the side of the cylinder 4, thereby quickly releasing the pressure and allowing the spring 11 to return the contactor to its initial position. The arm 7 being separate from the arm 12, the cam can pass arm 7, this swinging inactively. Valve 13 being turned to open position, the first contactor at the left is moved (automatically as hereinafter described) to close switch 3 and give the first transformer at the left a shot of energy. The contactor is provided with a trip portion 14 which then strikes air valve 15, opening the same and giving the next contactor at the right a shot of air and the next transformer a shot of current and so on down the row of transformers.

The source of power is sufficient to permit dividing the current for four or eight welds. It will be seen that, with this arrangement, there are no switches in the secondary circuit and, consequently, no trouble from arcing in the secondary circuit.

Now, referring to Fig. 13, the general diagram of the machine is shown: 16 and 17 are the usual safety starting valves used in connection with a fluid-operated press. Two are required to be opened so as to make sure that the press operator has his hands out of the machine. When they are open, they feed air through slide valve 18 into conduit 19 which leads to cylinder 20. The slide valve is at the moment in the right hand position. This operates slide valve 21 connecting the hydraulic reservoir 22 with pipe 23 which feeds into the bottom of cylinder 24. This moves piston 25 upwardly and straightens the toggle arms 26, bringing the ram with the pads 2 down against the work which here is a shroud and a dash panel. The ram has a trip lever 27 that trips air valve 28 sending a shot of air through pipe 29 to cylinder 30. This moves slide valve 18 to the left and connects air line 19 directly with the air main 32. The operator may, therefore, take his hands off the starting valves 16 and 17 and the machine will continue to operate through one cycle because of this "non-beat" device.

Pump 33 pumps liquid from tank 34 through pipe 36 into the hydraulic reservoir 22. A check valve 37 prevents the liquid flowing back through this line. The hydraulic reservoir is kept under considerable pressure by means of piston 38 in the top of the reservoir which tends downwardly by reason of the air pressure on the tandem pistons 39 and 40. The air pressure comes through line 41. The cylinders containing the tandem pistons are connected to a surge tank 42.

When trip valve 27 trips valve 28, air is also sent through line 43 to the cylinder 44. This shifts valve 45 to the left and connects hydraulic line 46 with the hydraulic line 47. This line 47 connects with the ventilator gutter electrode cylinders 48 and also with the electrode cylinders 49 below the work. It further connects with the cylinder 50 which brings the electrode pad 51, which carries the ventilator gutter, into contact with the shroud panel. Line 46 has a pressure reducing valve 52. The hydraulic line 47 has a by-pass 53 with a check valve 54. This by-pass is around a valve 55. In case of any excess pressure in the electrode cylinder, this valve 55 is lifted from its seat and the oil passes back into line 47 around check valve 54. The line leading through this relief valve 55 contains a check valve 56.

When the right hand pair of toggle links 26 straightens (Fig. 13), trip 57 strikes poppet valve stem 58, opens air valve 59 and sends air through line 60. Line 60 (see Fig. 14) is connected with the first contactor cylinder 4 at the right. This contactor is a timing device which closes a switch in a current supply line for a predetermined period. As already explained, trip 14 then trips the valve 15 which leads to the next contactor cylinder, energizing the primary of the next transformer and so on through the transformers.

Figure 9:
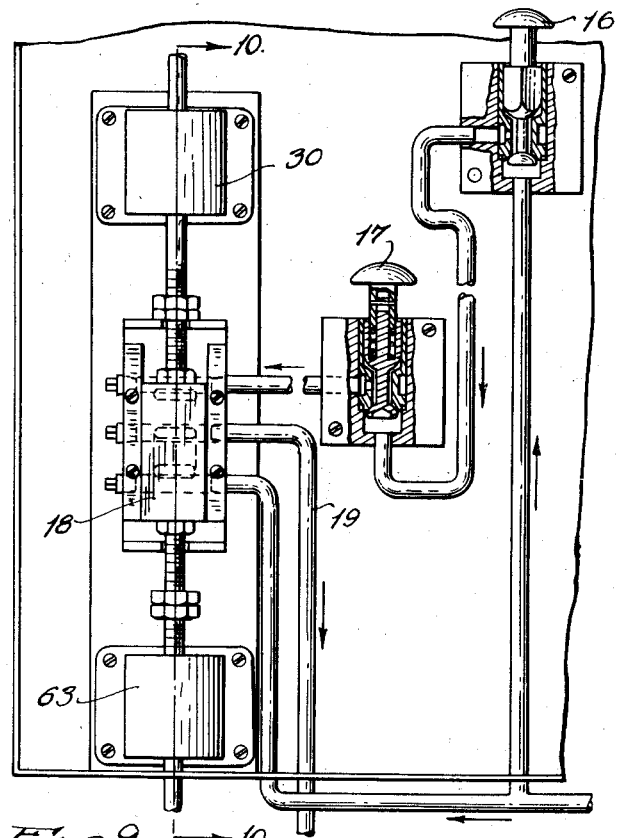
Fig. 9 is a detail of the starting valves taken on the line 9—9 of Fig. 10.
Figure 10:
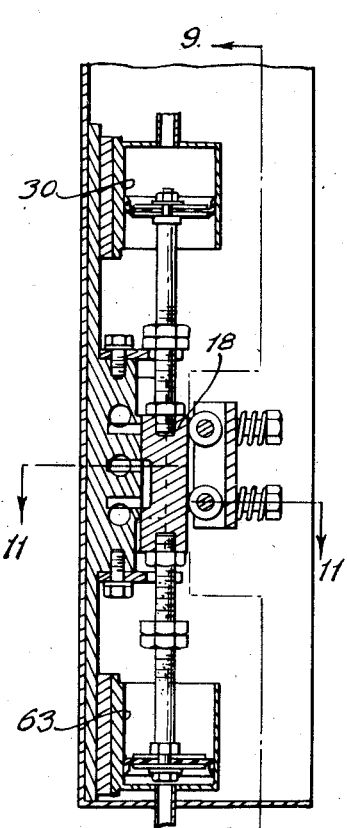
Fig. 10 is a section taken on the line 10—10 of Fig. 9.
Figure 12:
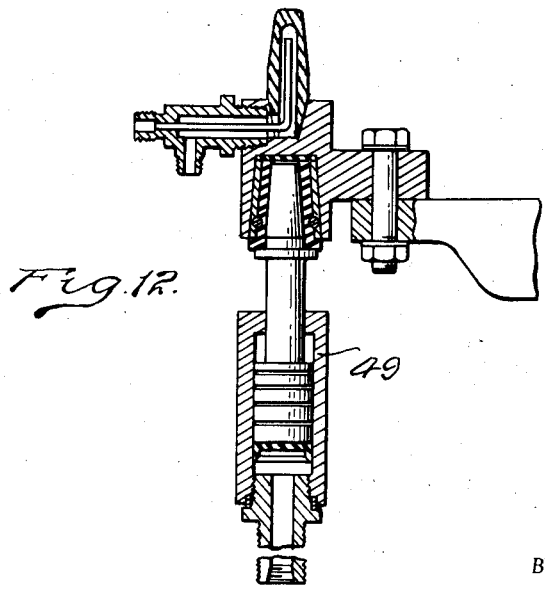
Fig. 12 is a longitudinal section of one of the electrodes.
Figure 11:
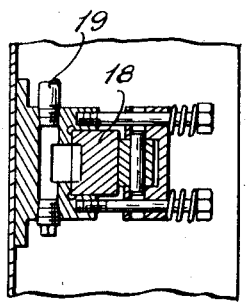
Fig. 11 is a section on the line 11—11 of Fig. 10.

The trip 14, connected with the last contactor at the right in Fig. 14, opens air valve 61, sending air through the line 62. This connects with air cylinder 63 (see Fig. 13). This moves the slide valve 18 back to the right and exhausts line 19 back through the air line 64, which leads to the manual valves 16 and 17. Valve 17, when in its uppermost position, connects line 64 to the atmosphere because valves 16 and 17 are square in cross section (see Fig. 9). This relieves the pressure on the right hand end of cylinder 20 and spring 65 will move the piston to the right, moving slide valve 21 to the right. This sends the hydraulic pressure through line 66 to the top of piston 25, causing the piston to descend and folding the toggle arms 26 to lift the ram and the electrode pads. Trip lever 27 swings idly by the stem of the trip valve 28.

When the last contactor rod 14 opens valve 61, it also sends air to the cylinder 67, reversing the slide valve 45 which moves to the right. This relieves the hydraulic pressure in the ventilator gutter electrode cylinders 48 and the electrode cylinders . The hydraulic pressure in cylinder 50 is reversed, moving the ventilator gutter electrode pads 51 to the inactive position.

Thereupon, the operator depresses valve 68, letting air into the ejector cylinder 69 which raises the ejector frame 70, which is provided with rolls 71. The work may then be pulled out of the machine, being facilitated by the rolls 71 (as shown in Fig. 8).

The ram is provided with a heel 101 (Fig. 1) which slides in back of the ventilator gutter electrode support 102. This stabilizes the ram and the electrode pads 104 (Fig. 6) which it carries with respect to the electrodes 103 which are supported on the ventilator gutter electrode support 102.

Ball detents 110 (Fig. 6) hold the ventilator gutter in place on jig 111 for the welding.

We claim:

1. In a machine for multiple spot welding, a plurality of electrodes and electrode circuits; means for causing the electrodes and the electrode circuits to maintain all the electrode circuits through the work during the welding operations, a plurality of primary circuits in inductive relation, each with a plurality of electrode circuits and means for successively closing and opening the primary circuits so that only the group of electrodes associated with one primary is energized at one time.

2. In a multiple spot welding machine, the combination of a plurality of transformers, each including one primary circuit and a plurality of wholly independent secondary circuits, each of the latter having a plurality of electrodes in series for simultaneously making a plurality of spot welds, means for causing the electrodes all to contact the work during a given period and close all the secondary circuits through the work and means for successively closing the primary circuits through the transformers and opening the same, each primary being opened before the next primary circuit is closed.

3. In a gang spot welder, the combination of a large number of spot welding electrodes simultaneously actuated and arranged to at one time contact the work, a plurality of transformers each including a primary circuit and a plurality of wholly independent secondary circuits, the secondary circuits arranged to each have a plurality of electrode sets in series in each secondary circuit to afford series welds and means for sequentially closing and opening the primaries in each transformer so that only one primary is energized at a time.

4. In a gang spot welder, the combination of a plurality of spot welding electrodes arranged to at one time grip the work, a plurality of transformers each including a primary circuit and a plurality of secondary circuits, and means for sequentially closing and opening the primaries in each transformer comprising contactors and timers arranged to open and close and time the circuit and power means for operating the contactors, the said contactors arranged as each finishes its operation to initiate operation of the next succeeding contactor and timer.

5. In a gang spot welder, the combination of a plurality of spot welding electrodes, means for bringing the work and the electrodes into contact so that all the electrodes at one time contact the work, a plurality of transformers affording secondary welding current to selected groups of said electrodes and means for successively furnishing current to the primary circuits of the several transformers, and contactors which sequentially close and open the primary circuits of the several transformers, each contactor at the limit of its movement arranged to initiate operation of the next succeeding contactor.

6. In a welding machine, a plurality of electrodes and electrode pads, fluid-operated means for bringing the electrode pads into contact with the work, fluid-operated means controlled by the operation of the first said means for bringing the electrodes and for individually supporting each electrode into contact with the work and a common supply of fluid being open to all the individual fluid-operated electrode supporting means at one time.

7. In a gang spot welding machine, the combination of a plurality of electrodes and a plurality of electrode pads, hydraulically-operated means for bringing the pads into contact with the work and for individually supporting each electrode against the work, a common supply of liquid being open to all the individual hydraulic electrode supporting means at one time and pneumatically-operated means for controlling the said hydraulic means and insuring one complete cycle of operation once the pneumatic means has been started.

8. In a welding machine, the combination of a plurality of electrodes, hydraulic means for individually bringing and supporting each electrode against the work, a common supply of liquid being open to all the individual hydraulic electrode supporting means at one time, a hydraulic valve for controlling the liquid operating the electrodes and pneumatic means with a holding (non-beat) control for operating said hydraulic valve.

9. In a welding machine, the combination of a plurality of electrodes, hydraulic means for individually supporting each electrode against the work and providing an independent actuating cylinder for each electrode, a common supply of liquid being open to all the individual hydraulic electrode supporting means at one time, a hydraulic valve for controlling the liquid operating the electrodes and pneumatic means for operating the said hydraulic valve and including a pair of actuating valves as a safety factor.

10. In a welding machine, the combination of a plurality of electrodes, hydraulic means for individually bringing and supporting each electrode against the work, a common supply of liquid being open to all the individual hydraulic electrode supporting means at one time, a hydraulic valve for controlling the liquid operating the electrodes and pneumatic means including an actuating valve and a pneumatic non-beat valve for operating said hydraulic valve, said non-beat valve being actuated by the pneumatic pressure to form a connection with the air source even after the actuating valve has been released.

11. In a welding machine, a plurality of spot welding electrodes, a plurality of electrode pads opposing said electrodes, a ram for carrying said electrode pads, fluid-operated means for forcing the electrode pads onto the work and for individually supporting each of the electrodes and a common supply of fluid being open to all the individual fluid-operated electrode supporting means at one time.

12. In a welding machine, the combination of a ram for coming down on the work, electrodes a multiplicity of which contact the work at one time, means for successively sending welding current through groups of said electrodes and means for lifting the ram and releasing the work from the electrodes, the said above-mentioned elements operating automatically in succession, the said means for successively sending the welding current through said groups of electrodes including a member tripped upon the descent of the ram for initiating the operation of said means and a valve operated by the said same means when the same finishes sending current to the last group of electrodes which valve is tripped by said means to initiate the lift of the ram.

13. In a welding machine, the combination of a ram for coming down on the work, electrodes a multiplicity of which contact the work at one time, means for successively sending welding current through groups of said electrodes, means for lifting the ram and releasing the work from the electrodes, a trip valve and slide valve, the former tripped by the ram as it descends, said trip valve affording fluid to move the slide valve to furnish a continuous supply of operating fluid that causes the elements to go through one complete cycle of operations before the machine stops, the said above-mentioned means operating automatically in succession.

14. In a welding machine, the combination of a ram, comprising a multiplicity of electrode pads, a plurality of pad portions in each unit pad for conducting the current in a series weld, electrodes for opposing the pad contact portions that engage the work arranged in groups for series welds, fluid-operated means for bringing the electrode pads down on the work, fluid-operated means individually backing up each electrode and equalizing their pressure on the work, a common supply of fluid being open to all the individual fluid-operated electrode backing means at one time and means for controlling such operations comprising a fluid supply and a fluid control valve.

15. In a welding machine, the combination of a ram, comprising a plurality of electrode pads, a plurality of pad portions in each pad for conducting the current in a series weld, a plurality of electrodes for opposing the pad portions that engage the work, groups of which are arranged for series welds, fluid-operated means for bringing the electrode pads down on the work and separate hydraulic means supporting each electrode and equalizing their pressure on the work, a common supply of liquid being open to all the individual hydraulic electrode supporting means at one time and means for controlling such operations of the electrode pads comprising a hydraulic supply and a hydraulic control valve and a pneumatic supply system including a slide valve and manual safety valves operating said slide valve, the said pneumatic slide valve controlling the hydraulic valve.

16. In a welding machine, the combination of a ram, comprising a plurality of electrode pads, a plurality of contact portions in each unit pad for conducting the current in a series weld, a plurality of electrodes for opposing the pad portions that engage the work, groups of which are arranged for series welds, fluid-operated means for bringing the electrode pads down on the work and fluid-operated means backing up the electrodes and equalizing their pressure on the work, means for controlling such operations comprising a hydraulic supply and a hydraulic control valve and a pneumatic supply system including a slide valve and safety manual valves operating said slide valve, the said slide valve controlling the hydraulic valve and means upon the descent of the ram a given distance for operating the slide valve to slide the same to by-pass the fluid supply around the manually operated safety valves so that these may be released and the machine will go through one complete cycle of operations before stopping.

17. In a welding machine, a ram and electrodes, a multiplicity of which are brought into welding-pressure contact with the work and maintained there at one time, means to cause these operations with fluid pressure and means for initiating successive shots of current through groups of electrodes as the ram reaches its lowermost position, comprising a trip valve tripped by the ram mechanism as it reaches its lowermost position and a plurality of contactors successively operated by the fluid pressure when the said valve is tripped by the ram to furnish successive shots of current to groups of said electrodes.

18. In a welding machine, a ram and electrodes, a multiplicity of which are brought into contact with the work and maintained there at one time, means to cause these operations with fluid pressure and means for initiating successive shots of current through groups of electrodes as the ram reaches its lowermost position, comprising a trip valve tripped by the ram mechanism as it reaches its lowermost position and a plurality of contactors successively operated by the fluid pressure when the said valve is tripped by the ram to furnish successive shots of current to groups of said electrodes, each contactor provided with a trip to trip a fluid valve that operates the next contactor.

19. In a welding machine, a ram and electrodes, a multiplicity of which are brought into contact with the work and maintained there at one time, means to cause these operations with fluid pressure and means for initiating successive shots of current through groups of electrodes as the ram reaches its lowermost position, comprising a trip valve tripped by the ram mechanism as it reaches its lowermost position and a plurality of contactors successively operated by the fluid pressure when the said valve is tripped by the ram to furnish successive shots of current to groups of said electrodes, each contactor provided with a trip to trip the fluid valve that operates the next contactor, the last contactor tripping the fluid valve in an air line which initiates valve operation to lift the ram and release the pressure maintained against the electrodes.

20. A multiple spot welder, comprising a multiplicity of reciprocatable electrodes, means for bringing the same into contact with the work and maintaining them all in such contact during the welding operations, a source of electrical energy capable of furnishing ample current for a group of good welds simultaneously made, a circuit leading from said source and subdivided to form a plurality of primary circuits of transformers, one for each group of welds, a switch in each circuit, a plurality of secondary circuits permanently closed save at the electrodes, each entirely independent of another, a plurality associated with each primary circuit and forming with such primary one transformer, and means for successively closing and opening each primary switch to successively spot weld the work in groups of spots.

21. A machine for multiple spot welding comprising means for bringing a multiplicity of electrodes into contact with the work before any welding begins and maintaining them in contact with the work until after all the welding operations are completed, a source of electrical energy capable of making a limited group of good welds simultaneously and a wiring and transformer arrangement between the source of energy and the electrodes in which the main circuit from the source of energy is subdivided into a plurality of primary circuits, each primary circuit provided with a make and break switch and each transformer having a plurality of independent secondary circuits each permanently closed save at the electrodes and each including a plurality of electrodes arranged to make one or more welds but only part of the group of welds which are simultaneously made with the aid of one transformer and means for successively operating said switches for closing and opening the primaries of each transformer to successively make the said group of welds.

22. A machine for multiple spot welding comprising a multiplicity of electrodes, means for bringing said electrodes into contact with the work before any welding begins and maintaining them in contact with the work until after all the welds are completed, a source of electrical energy capable of making a group of good welds simultaneously and wiring and transformers between the source of energy and the electrodes in which the main circuit from the source of energy is subdivided into a plurality of branch primary circuits, each primary circuit provided with a make and break switch and coupled with one transformer which has a plurality of independent secondary circuits each normally closed save at the electrodes and each including a plurality of electrodes arranged in series to make a plurality of welds but only part of the group of welds which are simultaneously made with the aid of one transformer and means for successively operating said switches for closing and opening the primaries of each transformer to successively make the said groups of welds.

EDWARD G. BIEDERMAN.
DELMAR S. HARDER.